US006986960B2

(12) United States Patent
Oguri et al.

(10) Patent No.: US 6,986,960 B2
(45) Date of Patent: Jan. 17, 2006

(54) POLY (ARYLENE ETHER SULFONE) HAVING SULFOALKOXY GROUP, PROCESS OF PRODUCING THE SAME, AND POLYMER ELECTROLYTE MEMBRANE COMPRISING THE SAME

(75) Inventors: Motohiro Oguri, Yokkaichi (JP); Ryuji Ikeda, Yokkaichi (JP); Fumio Okisaki, Sagamihara (JP)

(73) Assignee: Tosoh Corporation, Yamaguchi (JP)

( * ) Notice: Subject to any disclaimer, the term of this patent is extended or adjusted under 35 U.S.C. 154(b) by 389 days.

(21) Appl. No.: 10/298,936

(22) Filed: Nov. 19, 2002

(65) Prior Publication Data

US 2003/0104259 A1 Jun. 5, 2003

(30) Foreign Application Priority Data

Nov. 22, 2001 (JP) .......................... P. 2001-357457
Dec. 26, 2001 (JP) .......................... P. 2001-394291

(51) Int. Cl.
*H01M 8/10* (2006.01)
*C08J 5/20* (2006.01)

(52) U.S. Cl. .......................... 429/30; 429/314; 521/25; 521/30; 521/34; 528/99; 528/391

(58) Field of Classification Search ................. 429/30, 429/31, 32, 33, 314; 528/99, 391; 521/25, 521/26, 27, 28, 29, 30, 34
See application file for complete search history.

(56) References Cited

U.S. PATENT DOCUMENTS 4,762,869 A * 8/1988 Heinz et al. .............. 528/99 X 5,985,477 A * 11/1999 Iwasaki et al. ................ 429/33
6,087,031 A * 7/2000 Iwasaki et al. ................ 429/33
6,194,474 B1 * 2/2001 Kerres et al. .................. 521/27
6,670,065 B2 * 12/2003 Koyama et al. .............. 429/33

FOREIGN PATENT DOCUMENTS

EP 1 078 947 A1 2/2001
EP 1 099 468 A2 5/2001

OTHER PUBLICATIONS

Michael D. Guiver et al., Modified Polysulfones. III. Synthesis and Characterization of Polysulfone Aldehydes for Reactive Membrane Materials, Journal of Polymer Science, Part A: Polym. Com. vol. 39, (Jan. 25, 2001), pp. 675-682.

(Continued)

Primary Examiner—Stephen J. Kalafut
(74) Attorney, Agent, or Firm—Sughrue Mion, PLLC (57) ABSTRACT

A novel poly(arylene ether sulfone) having a sulfoalkoxy group, which has both of heat resistance and electroconductivity, is suitable as polymer electrolyte membranes used for high performance polymer electrolyte fuel cells, and does not use fluorine so that loads to the environment are small in the synthesis or disposal, a process of producing the same, and a polymer electrolyte membrane comprising the same. The poly(arylene ether sulfone) having a sulfoalkoxy group has a structural unit represented by the formula (1) mentioned hereinabove, and is produced by reacting a poly (arylene ether sulfone) having a hydroxyl group with a specific alkali metal compound and/or an organic base compound, followed by reacting with a specific sulfonating agent and then with a specific acid. A polymer electrolyte membrane is produced by film formation of the polymer.

12 Claims, 2 Drawing Sheets

OTHER PUBLICATIONS

Jochen A. Kerres, Development of Ionomer Membranes for Fuel Cells, Journal of Membrane Science, vol. 185, (Apr. 15, 2001), pp. 3-27.

Benoit Lafitte et al., Sulfophenylation of Polysulfones for Proton-Conducting Fuel Cell Membranes, Macromol. Rapid Commun. (Nov. 5, 2002), pp. 896-900.

European Search Report dated Jan. 28, 2003.

* cited by examiner

POLY (ARYLENE ETHER SULFONE) HAVING SULFOALKOXY GROUP, PROCESS OF PRODUCING THE SAME, AND POLYMER ELECTROLYTE MEMBRANE COMPRISING THE SAME

FIELD OF THE INVENTION

The present invention relates to a novel poly(arylene ether sulfone), a process of producing the same, and a polymer electrolyte membrane comprising the same.

The poly(arylene ether sulfone) according to the present invention has both heat resistance and electroconductivity and does not use fluorine. Therefore, such a polymer is useful as polymeric materials that apply low loads to the environment in the synthesis or disposal.

In addition, the poly(arylene ether sulfone) according to the present invention is useful as a polymer electrolyte membrane suitable for use in high performance polymer electrolyte fuel cells.

DESCRIPTION OF THE RELATED ART

Poly(arylene ether sulfone)s have conventionally been used as engineering plastics having high heat resistance and high chemical resistance in various fields. However, though those poly(arylene ether sulfone)s are excellent in heat resistance and chemical resistance, they are electrically insulating substances and electricity cannot pass through the same.

In recent years, there have been demanded high-function polymeric materials having not only high heat resistance and high chemical resistance but also electroconductivity. As a method for making a material have electroconductivity, it has been tried to introduce ion-exchangeable functional groups. For example, *J. Polymer Sci., Polym. Chem. Ed.*, Vol. 22, 721 (1984) discloses poly(arylene ether sulfone)s having a sulfo group directly bonded to an aromatic ring.

In addition, in recent years, fuel cells have been in the limelight as a new energy technology having a high energy efficiency with environmental problems for the background. Of such fuel cells, polymer electrolyte fuel cells using a polymer as an electrolyte have a high maximum current density and can work at low temperatures. Therefore, they are suitable for mobile power sources of automobiles, etc., and for small-capacity power sources for portable electronic instruments, etc. Thus, such polymer electrolyte fuel cells are particularly noticed.

As polymer electrolyte membranes of polymer electrolyte fuel cells, perfluorocarbon polymer electrolyte membranes represented by, for example, NAFION (a registered trade mark, du Pont, a perfluorasulfonate jonoiner) are known (JP 11-2041 19A).

Further, fluorine-free hydrocarbon polymer electrolyte membranes are also known. For example, JP 11-116679A discloses poly(arylene ether sulfone)s having a sulfo group directly bonded to a main chain aromatic ring, and International Application 11-515040A (Japan) discloses polyphenylenes having a sulfo group directly bonded to a main chain aromatic ring. Further, JP 9-073908A discloses polybenzimidazoles having a sulfoalkyl group directly bonded to a main chain aromatic ring.

However, since in the poly(arylene ether sulfone)s disclosed in the above-cited literature reference, the sulfo group is directly bonded to the aromatic ring, there was the possibility of elimination of the sulfo group under specific high temperature conditions.

Further, the polymer electrolyte membranes disclosed in JP 11-204119A are not sufficient in heat resistance, and there was a problem that they cannot be used at a temperature exceeding 80° C. There was also a problem that since a large amount of fluorine is used, the loads applied to the environment are large during the synthesis or disposal.

Moreover, the polymer electrolyte membranes disclosed in JP 11-116679A and International Application 11-515040A (Japan) are not sufficient in performance as polymer electrolyte fuel cells, and the sulfo group is directly bonded to the main chain aromatic ring. Accordingly, there was a problem of elimination of the sulfo group under specific high temperature conditions. Still further, since the polymer electrolyte membranes disclosed in JP 9-073908A contain a nitrogen atom having high basicity in the main chain, the sulfoalkyl group forms a salt together with the nitrogen atom, so that there was a possibility that the performance as a polymer electrolyte fuel cell cannot sufficiently be exhibited.

SUMMARY OF THE INVENTION

The present invention has been made under the above circumstances.

Accordingly, one object of the present invention is to provide a novel poly(arylene ether sulfone) having a sulfoalkoxy group, which has both of heat resistance and electroconductivity, are suitable as polymer electrolyte membranes to be used for high performance polymer electrolyte fuel cells, and does not use fluorine so that loads to the environment are small in the synthesis or disposal.

Another object of the present invention is to provide a process of producing the poly(arylene ether sulfone).

Still another object of the present invention is to provide polymer electrolyte membranes comprising the poly(arylene ether sulfone).

As a result of extensive investigations to overcome the above-described problems, a novel poly(arylene ether sulfone) has been found. The present invention has been completed based on this finding.

The poly(arylene ether sulfone) having a sulfoalkoxy group according to the present invention has a structural unit represented by the following formula (1):

wherein
R$^1$ and R$^2$ independently represent a hydrogen atom or an alkyl group having from 1 to 6 carbon atoms; R$^3$ represents an alkylene group having from 1 to 10 carbon atoms; m represents an integer of 0 or 1; n represents an integer of 0 or 1; and (a+b+c+d) is greater than 0.

The process of producing the poly(arylene ether sulfone) having a sulfoalkoxy group according to the present invention comprises reacting a poly(arylene ether sulfone) having a hydroxyl group, which has a structural unit represented by the following formula (2):

(2)

wherein
$^4$ and R$^5$ independently represent a hydrogen atom or an alkyl group having from 1 to 6 carbon atoms; i represents an integer of 0 or 1; j represents an integer of 0 or 1; and (e+f+g+h) is greater than 0, with an alkali metal compound and/or an organic base compound to form an alkali metal salt and/or an amine salt, and reacting the alkali metal salt and/or the amine salt with a sulfonating agent and then with an acid.

DETAILED DESCRIPTION OF THE INVENTION

The present invention will be described in detail below.

(i) Poly(arylene ether sulfone) Having a Sulfoalkoxy Group

The poly(arylene ether sulfone) according to the present invention has a structural unit represented by the above-described formula (1) in the structural unit thereof.

In the formula (1), R$^1$ and R$^2$ independently represent a hydrogen atom or an alkyl group having from 1 to 6 carbon atoms. The alkyl group having from 1 to 6 carbon atoms is not particularly limited, and examples thereof include a methyl group, an ethyl group, a propyl group, a butyl group, a pentyl group, and a hexyl group. R$^1$ and R$^2$ may be connected to each other to form, for example, a tetramethylene group or a pentamethylene group.

R$^3$ represents an alkylene group having from 1 to 10 carbon atoms. The alkylene group having from 1 to 10 carbon atoms is not particularly limited, and examples thereof include a methylene group, an ethylene group, a propylene group, a methylpropylene group, a butylene group, a pentylene group, a hexylene group, a heptylene group, an octylene group, and a nonene group.

Of the poly(arylene ether sulfone)s according to the present invention, a poly(arylene ether sulfone) having a structural unit represented by the following formula (3):

(3)

wherein
R$^6$ represents an alkylene group having from 1 to 10 carbon atoms, and (o+p+q+r) is greater than 0;

a poly(arylene ether sulfone) having a structural unit represented by the following formula (4):

(4)

wherein $R^7$ represents an alkylene group having from 1 to 10 carbon atoms, and (s+t+u+v) is greater than 0; and a poly(arylene ether sulfone) having a structural unit represented by the following formula (5):

(5)

wherein $R^8$ represents an alkylene group having from 1 to 10 carbon atoms, and (x+y+z) is greater than 0, are preferable from ease for handling.

Of those, the poly(arylene ether sulfone) having a structural unit represented by the formula (3) is particularly preferable.

In the formulae (3), (4) and (5), $R^6$, $R^7$ and $R^8$ independently represent an alkylene group having from 1 to 10 carbon atoms. The alkylene group having from 1 to 10 carbon atoms is not particularly limited, and examples thereof include a methylene group, an ethylene group, a propylene group, a methylpropylene group, a butylene group, a pentylene group, a hexylene group, a heptylene group, an octylene group, and a nonene group. Of those groups, the propylene group and butylene group are preferred because high mechanical characteristics are achieved.

The poly(arylene ether sulfone) according to the present invention has a weight average molecular weight as reduced to pullulan of preferably from 1,000 to 500,000, and more preferably from 5,000 to 300,000, from the standpoints of excellent heat resistance, high solubility in solvents, and easy handling.

The weight average molecular weight as referred to herein can be measured by, for example, dissolving the poly(arylene ether sulfone) of the present invention in dimethyl sulfoxide, adjusting a concentration of the polymer solution to 1 g/liter, and pouring the solution for gel permeation chromatography at room temperature.

The poly(arylene ether sulfone) according to the present invention may be a homopolymer or a copolymer so far as it has a structural unit represented by the above-described formula (1).

In the poly(arylene ether sulfone) having a sulfoalkoxy group used in the present invention, (a+b+c+d) in the formula (1), (o+p+q+r) in the formula (3), (s+t+u+v) in the formula (4), and (x+y+z) in the formula (5) each represents the number of the sulfoalkoxy groups contained per the structural unit of the poly(arylene ether sulfone). The number of the sulfoalkoxy groups is within the range of preferably from 0.1 to 4.0, more preferably from 0.2 to 3.5, and most preferably from 0.5 to 3.0. When the number of the sulfoalkoxy groups falls within the above-specified range, the output performance of the polymer electrolyte fuel cell is enhanced, and the polymer electrolyte membrane has high mechanical strength.

(ii) Process of Producing Poly(arylene ether sulfone) Having a Sulfoalkoxy Group While the poly(arylene ether sulfone) according to the present invention may be produced by any process, it can be efficiently produced by, for example, reacting a poly(arylene ether sulfone) having a hydroxyl group, which has a structural unit represented by the following formula (2):

(2)

wherein $R^4$ and $R^5$ independently represent a hydrogen atom or an alkyl group having from 1 to 6 carbon atoms; i represents an integer of 0 or 1; i represents an integer of 0 or 1; and (e+f+g+h) is greater than 0, with an alkali metal compound and/or an organic base compound to form an alkali metal salt and/or an amine salt, and reacting the alkali metal salt and/or the amine salt with a sulfonating agent and then with an acid.

In the above formula (2), $R^4$ and $R^5$ independently represent a hydrogen atom or an alkyl group having from 1 to 6 carbon atoms. The alkyl group having from 1 to 6 carbon atoms is not particularly limited, and examples thereof include a methyl group, an ethyl group, a propyl group, a butyl group, a pentyl group, and a hexyl group. $R^4$ and $R^5$ may be connected to each other to form, for example, a tetramethylene group or a pentamethylene group.

While the poly(arylene ether sulfone) having a hydroxyl group, which has a structural unit represented by the formula (2), is not particularly limited with respect to the production process, it can be, for example, produced in the following manner. A poly(arylene ether sulfone) having a formly group is prepared from commercially available poly(arylene ether sulfone)s such as polysufones and polyether sulfones by, for example, the method reported in *Journal of Polymer Science: Part A; Polymer Chemistry,* 2001, Vol. 39, 675–682; the poly(arylene ether sulfone) having a formyl group is reacted and oxidized with an oxidizing agent to prepare a poly(arylene ether sulfone) having a formyloxy group; and the poly(arylene ether sulfone) having a formyloxy group is reacted with a metal-hydrogen complex compound to prepare the poly(arylene ether sulfone) having a hydroxyl group.

The alkali metal compound used in the process of the present invention is not particularly limited so far as it can convert the hydroxyl group into an alkali metal salt. Examples of the alkali metal compound include alkali metal alkoxides such as sodium methoxide, sodium ethoxide, potassium methoxide, potassium ethoxide, lithium t-butoxide, sodium t-butoxide, and potassium t-butoxide; alkali metal hydrides such as lithium hydride, sodium hydride, and potassium hydride; alkali metals such as sodium and potassium; organic alkali metals such as methyllithium and butyllithium; alkali metal amides such as lithium amide and sodium amide; alkali metal hydroxides such as sodium hydroxide and potassium hydroxide; and alkali metal carbonates such as sodium carbonate and potassium carbonate.

The organic base compound is not particularly limited so far as it can convert the hydroxyl group into an amine salt. Examples of the organic base compound include organic bases such as pyridine, lutidine, and toluidine.

Those alkali metal compounds and/or organic base compounds can be used alone or as mixtures of two or more thereof.

Of those, the alkali metal alkoxides are preferably used because they can efficiently convert the hydroxyl group into an alkali metal salt and have excellent handling properties. Sodium methoxide is more preferably used.

Amount of the alkali metal compound and/or the organic base compound used is not particularly limited. However, for efficient conversion into an alkali metal salt and/or an amine salt, the amount is preferably from 0.1 to 100 moles, more preferably from 0.5 to 20 moles, and most preferably from 1 to 10 moles, per mole of the hydroxyl group contained in the starting poly(arylene ether sulfone).

The sulfonating agent used in the process of the present invention is not particularly limited so far as it can efficiently perform the sulfonation. Examples of the sulfonating agent include alkyl sultones having a cyclic ester structure of sulfonic acid, such as 1,3-propane sultone, 1,4-butane sultone, 1,5-pentane sultone, 1-methyl-1,3-propane sultone, 1-ethyl-1,3-propane sultone, 1-propyl-1,3-propane sultone, 1-butyl-1,3-propane sultone, 1-methyl-1,4-butane sultone, 1-ethyl-1,4-butane sultone, and 1-octyl-1,4-butane sultone; and sulfoalkyl halides such as sodium chloromethanesulfonate, sodium bromomethanesulfonate, sodium chloroethanesulfonate, sodium bromoethanesulfonate, sodium chloropropanesulfonate, sodium bromopropanesulfonate, methyl chloromethanesulfonate, methyl bromomethanesulfonate, methyl chloroethanesulfonate, methyl bromoethanesulfonate, ethyl chloromethanesulfonate, ethyl bromomethanesulfonate, ethyl chloroethanesulfonate, ethyl bromoethanesulfonate, bromomethanesulfonic acid trimethylamine, chloroethanesulfonic acid trimethylamine, and bromoethanesulfonic acid trimethylamine. Those sulfonating agents can be used alone or as mixtures of two or more thereof.

Of those, the alkyl sultones are preferably used because they are industrially produced, are readily available, and have excellent stability during handling. 1,3-propane sultone and 1,4-butane sultone are more preferably used.

Amount of the sulfonating agent used is not particularly limited. However, for efficient sulfonation, the amount is preferably from 0.1 to 1,000 moles, more preferably from 0.5 to 100 moles, and most preferably from 1 to 50 moles, per mole of the hydroxyl group contained in the starting poly(arylene ether sulfone).

The acid that is used in the process of the present invention is not particularly limited so far as it can efficiently form a sulfo group. Examples of the acid include mineral acids such as hydrochloric acid, sulfuric acid, nitric acid, and phosphoric acid; acetic acids such as trichloroacetic acid and trifluoroacetic acid; m-ethanesulfonic acids such as trifluoromethanesulfonic acid and methanesulfonic acid; solid acids such as zeolites, silica-alumina, alumina, and heteropoly-acid; and strongly acidic exchange resins. Those acids can be used alone or as mixtures of two or more thereof. Of those, the mineral acids are preferably used because of excellent handling properties. Hydrochloric acid is more preferably-used.

Amount of the acid used is not particularly limited. However, for efficient formation of the sulfo group, the amount is preferably from 0.1 to 1,000 moles, more preferably from 0.5 to 100 moles, and most preferably from 1 to 20 moles, per mole of the sulfonating agent.

Preferably, each of the reaction of the poly(arylene ether sulfone) having a hydroxyl group, which has a structural unit represented by the formula (2), with the alkali metal compound and/or the organic base compound, the subsequent reaction with the sulfonating agent, and the reaction with the acid is usually carried out in a solvent. The solvent used is not particularly limited so far as it does not markedly inhibit each of the reactions. Examples the solvent include aromatic hydrocarbons such as benzene, toluene, and xylene; alcohols such as methanol, ethanol, n-propanol, isopropanol, n-butanol, t-butanol, n-pentanol, n-hexanol, cyclohexanol, and octanol: ethers such as diethyl ether, tetrahydrofuran, dioxane, diglyme, and triglyme; nitrogen-containing hydrocarbons such as N,N-dimethylformamide and hexamethylphosphoryltriamide; sulfur-containing hydrocarbons such as dimethyl sulfoxide and sulfolane; and water. Those solvents can be used alone or as mixtures of two or more thereof.

The solvents used in the reaction with the alkali metal compound and/or the organic base compound, the subsequent reaction with the sulfonating agent, and the reaction with the acid, are not always the same. However, in the reaction with the alkali metal compound and/or the organic base compound and the subsequent reaction with the sulfonating agent, mixtures of ethers and alcohols are preferably used because high reaction efficiency is obtained. A mixture of tetrahydrofuran and methanol is more preferably used. In the reaction with the acid, ethers and water are preferably used because high reaction efficiency is obtained.

Concentration of the poly(arylene ether sulfone) having a hydroxyl group, which has a structural unit represented by the formula (2) (that is, the concentration means a value obtained by dividing a weight (g) of the poly(arylene ether sulfone) having a hydroxyl group by the molecular weight of the structural unit and further dividing by an amount (L) of the solvent to be added; and this value is hereinafter referred to as "polymer concentration"), is preferably from 0.1 to 1,000 mmoles/liter, and more preferably from 1 to 100 mmoles/liter because the respective reactions can be carried out efficiently.

Temperature in the reaction of the poly(arylene ether sulfone) having a hydroxyl group with the alkali metal compound and/or the organic base compound is not particularly limited, but is, for example, from −100 to 150° C., and preferably from −20 to 80° C. Reaction pressure is not particularly limited, but is usually from 0.001 to 3 MPa, and preferably from 0.01 to 0.3 MPa, in terms of absolute pressure. Further, reaction time varies depending on the temperature and the polymer concentration and cannot be unequivocally defined, but is usually from 5 minutes to 500 hours. Atmosphere in the reaction is not particularly limited, but, for example, nitrogen, argon and helium are preferably used as an atmospheric gas. This reaction can be carried out in any of batch type, semi-batch type and continuous type.

Temperature of the subsequent reaction with the sulfonating agent is not particularly limited, but is, for example, from −20 to 100° C., and preferably from 0 to 80° C. Reaction pressure is not particularly limited, but is usually from 0.001 to 3 MPa, and preferably from 0.01 to 0.3 MPa in terms of absolute pressure. Further, reaction time varies depending on the temperature and the polymer concentration and cannot be unequivocally defined, but is usually from 5 minutes to 500 hours. Atmosphere in the reaction is not particularly limited, but, for example, nitrogen, argon and helium are preferably used as an atmospheric gas. This reaction can be carried out in any of batch type, semi-batch type and continuous type.

Temperature of the reaction with the acid subsequently carried out is not particularly limited, but is, for example, from −80 to 150° C., and preferably from −20 to 80° C. Reaction pressure is not particularly limited, but is usually from 0.001 to 3 MPa, and preferably from 0.01 to 0.3 MPa in terms of absolute pressure. Further, reaction time varies depending on the temperature and the polymer concentration and cannot be unequivocally defined, but is usually from 1 minute to 500 hours. Atmosphere in the reaction is not particularly limited, but, for example, nitrogen, argon and helium are preferably used as an atmospheric gas. This reaction can be carried out in any of batch type, semi-batch type and continuous type.

The poly(arylene ether sulfone) having a sulfoalkoxy group according to the present invention can be separated from the reaction mixture by a conventional reprecipitation method.

While the poly(arylene ether sulfone) having a sulfoalkoxy group according to the present invention can be used as a polymer material as it stands, it can be used as a mixture with, for example, fillers (such as glass fibers, carbon fibers, talc, calcium carbonate, and mica), various pigments, and various stabilizers (such as antioxidants and photo-stabilizers). Further, it can also be used as an alloy blend with, for example, general-purpose resins (such as polyethylene, polyvinyl chloride, and polystyrene), engineering plastics (such as polypropylene and modified polyphenylene ethers), and super-engineering plastics (such as polyphenylene sulfide, polyphenylene sulfide ketone, polyimides, polyether imides, and liquid crystal polymers).

(iii) Polymer Electrolyte Membrane

Since the poly(arylene ether sulfone) according to the present invention is a polymer material having both of heat resistance and electroconductivity, it is useful as a polymer electrolyte membrane and is also useful as a polymer electrolyte membrane suitable for polymer electrolyte fuel cells.

A method of forming a polymer electrolyte membrane using the poly(arylene ether sulfone) having a sulfoalkoxy group according to the present invention is not particularly limited. Examples of the method include film formation methods such as solvent casting, melt pressing, and melt extrusion.

The film formation method by solvent casting is not particularly limited so far as it can efficiently achieve the film formation. For example, the film formation by solution coating can be carried out in a manner in which the poly(arylene ether sulfone) having a sulfoalkoxy group is dissolved in a solvent, the solution is cast on a substrate, the solvent is removed off, and a membrane is then peeled off from the substrate, thereby completing the film formation.

The solvent used for the solvent casting is not particularly limited so far as it uniformly dissolves the poly(arylene ether sulfone) having a sulfoalkoxy group therein. Examples of the solvent include aromatic hydrocarbons such as benzene, toluene, and xylene; alcohols such as methanol, ethanol, n-propanol, isopropanol, n-butanol, t-butanol, n-pentanol, n-hexanol, cyclohexanol, and octanol; ketones such as acetone, methyl ethyl ketone, and cyclohexanone; ethers such as diethyl ether, tetrahydrofuran, dioxane, diglyme, and triglyme; alkylene glycol monoalkyl ethers such as ethylene glycol monomethyl ether, ethylene glycol monoethyl ether, propylene glycol monomethyl ether, and propylene glycol monoethyl ether; nitrogen-containing hydrocarbons such as N,N-dimethylformamide, N,N-dimethylacetamide, N-methyl-2-pyrrolidone, and hexamethylphosphoryltriamide; sulfur-containing hydrocarbons such as dimethyl sulfoxide and sulfolane; and water. Those solvents can be used alone or as mixtures of two or more thereof.

Solution concentration of the poly(arylene ether sulfone) having a sulfoalkoxy group during the film formation by solvent casting is preferably from 0.001 to 10 kg/liter, and more preferably from 0.01 to 2 kg/liter because the poly(arylene ether sulfone) having a sulfoalkoxy group can be uniformly cast on the substrate.

The substrate is not particularly limited so far as the poly(arylene ether sulfone) having a sulfoalkoxy group can be uniformly cast thereon, and a membrane can be efficiently peeled off therefrom. Examples of the substrate include glasses, polytetrafluoroethylene-made films, and polyethylene terephthalate-made films.

Temperature in the solvent casting is not particularly limited, but is, for example, from 0 to 100° C., and preferably from 10 to 80° C. Atmosphere during the film formation is not particularly limited, but, for example, nitrogen, argon and helium are preferably used as an atmospheric gas.

In the solvent casting, a film blade or a film casting knife may be used. Those give rise to effects for making the film thickness adjustment easy, etc.

The film formation by melt pressing is not particularly limited so far as it can efficiently achieve the film formation.

For example, the film formation can be carried out in a manner in which the poly(arylene ether sulfone) having a sulfoalkoxy group is molten, and the melt is subjected to thermal pressing by a pressing machine, thereby completing the film formation.

Temperature during the film formation by melt pressing is not particularly limited, but is, for example, from −20 to 300° C., and preferably from 0 to 200° C. Pressure is not particularly limited, but is usually from 0.001 to 50 MPa, and preferably from 0.2 to 30 MPa in terms of absolute pressure. Atmosphere during the melt pressing is not particularly limited, but, for example, nitrogen, argon and helium are preferably used as an atmospheric gas.

The film formation by melt extrusion is not particularly limited so far as it can efficiently achieve the film formation. For example, the film formation can be carried out in a manner in which the poly(arylene ether sulfone) having a sulfoalkoxy group is molten, and the melt is extruded by an extruder, thereby completing the film formation.

Of those film formation methods (including solvent casting, melt pressing, and melt extrusion), the solvent casting is preferably used because a uniform and thin polymer electrolyte-membrane can be formed.

Thickness of the polymer electrolyte membrane is preferably from 0.1 to 100,000 μm, and preferably from 1 to 1,000 μm, from the standpoint of high mechanical strength.

When the polymer electrolyte membrane is used for polymer electrolyte fuel cells, it is usually used in a form of a membrane electrode assembly.

In the polymer electrolyte fuel cell membrane electrode assembly, thickness of the polymer electrolyte membrane according to the present invention is preferably from 1 to 300 μm, and more preferably from 5 to 150 μm, from that high proton conductivity is obtained.

The present invention is described below in more detail with reference to the following Examples, but it should not be construed that the invention is limited thereto.

Measurement methods used in the Examples are described below.

$^1$H-Nuclear Magnetic Resonance Absorption (Hereinafter Referred to as "NMR") and $^{13}$C-NMR Measurements The measurements were carried out using a nuclear magnetic resonance unit (a trade name: JNMGX400, produced by JEOL Ltd.).

Measurement of Molecular Weight

Gel permeation chromatography (hereinafter referred to as "GPC") measurement was carried out using a high-performance GPC unit (a trade name: HLC8220GPC, produced by Tosoh Corporation) under the following conditions. A polymer was dissolved in a lithium chloride/N,N-dimethylformamide solution or a lithium chloride/dimethyl sulfoxide solution (10 mmoles/liter in the both); a concentration of the polymer solution was adjusted to 1 g/liter; 20 μl of the polymer solution was poured into the GPC unit equipped with a TSKgel Super-AWMH column (a trade name); and a weight average molecular weight (Mw) and a number average molecular weight (Mn) as reduced to pullulan were measured using pullulan as a standard sample.

Molecular weight distribution (Mw/Mn) was expressed by a value obtained by dividing the weight average molecular weight (Mw) by the number average molecular weight (Mn).

However, in the case where it was not suitable to use pullulan as the standard sample, the weight average molecular weight (Mw) and the number average molecular weight (Mn) as reduced to polystyrene were measured using polystyrene as the standard sample.

Measurement of Proton Conductivity

Measurement of proton conductivity was carried out in the following manner. A sample membrane was placed in an atmosphere maintained at constant temperature and humidity conditions for 24 hours; after the water content of the membrane reached an equilibrium state, the membrane was set in a 4-terminal cell; the electrical resistance of the polymer electrolyte membrane was measured under predetermined constant temperature and humidity conditions (at 50° C. and at a relative humidity of 90%, or at 130° C. and at a relative humidity of 90%) using an impedance analyzer (a trade name: Impedance Analyzer 4194A, produced by Yokogawa-Hewlett-Packard, Ltd.). Proton conductivity (S/cm) was calculated from the electrical resistance of the polymer electrolyte membrane, a cross-sectional area of the membrane, and a distance between potential electrodes.

Incidentally, measurement in an atmosphere at 50° C. and at a relative humidity of 90% was carried out by setting the 4-terminal cell in a thermo-hygrostat (a trade name: IG400, produced by Yamato Scientific Co., Ltd.). Further, measurement in an atmosphere at 130° C. and at a relative humidity of 90% was carried out by setting the 4-terminal cell in a pressure vessel made by Taiatsu Techno Corporation, elevating the temperature at 130° C., and controlling the temperature and humidity by passing a water vapor through the pressure vessel under an elevated pressure (0.3 MPa) such that the relative humidity became 90%.

SYNTHESIS EXAMPLE 1

Synthesis of Poly(arylene ether sulfone) Having a Bromine Group:

110 g of a poly(arylene ether sulfone) (Mn: ca. 26,000, Tg: 190° C., a trade name: Polysulfone, produced by Aldrich Co.) represented by the following formula (6):

(6)

was charged in a 1,000 ml separable flask, and dissolved in 600 ml of chloroform. 110 g of bromine was added dropwise to the solution, and the mixture was stirred for 24 hours. The reaction mixture was poured into a large amount of methanol to deposit a polymer. The deposited polymer was separated by filtration, thoroughly rinsed with methanol, and then dried in vacuo at 40° C. for one day. Thus, 137 g of a poly(arylene ether sulfone) having a bromine group was obtained.

The poly(arylene ether sulfone) having a bromine group thus obtained was subjected to $^1$H-NMR measurement (solvent: chloroform-d). As a result, the poly(arylene ether sulfone) having a bromine group had 1.9 bromine groups per the structural unit of the poly(arylene ether sulfone).

SYNTHESIS EXAMPLE 2

Synthesis of Poly(arylene ether sulfone) Having a Formyl Group:

36 g of the poly(arylene ether sulfone) having a bromine group obtained in Synthesis Example 1 above was charged in a 10 liters separable flask, and dissolved in 6 liters of tetrahydrofuran. After cooling to −78° C., 50 ml of 2.66 moles/liter of an n-butyllithium hexane solution was gradually added dropwise to the solution, and the mixture was stirred at −78° C. for 30 minutes. 38 ml of N,N-dimethylformamide was gradually added dropwise to the resulting solution, and the mixture was stirred at −78° C. for one hour and then at room temperature for one hour. After completion of the reaction, the reaction mixture was poured into a large amount of a hydrochloric acid/methanol mixed solution to deposit a polymer. The deposited polymer was separated by filtration, thoroughly rinsed with methanol, allowed to stand in a nitrogen stream overnight, and then dried in vacuo at room temperature for 6 hours. Thus, 22 g of a poly(arylene ether sulfone) having a formyl group was obtained.

As a result of the $^1$H-NMR measurement (solvent: chloroform-d), a peak based on an isopropylidene group was observed at δ1.7 ppm (s), a peak based on an aromatic ring was observed at δ6.9 to 8.0 ppm (m), and a peak based on a formyl group was observed at δ10.2 to 10.8 ppm (m). The number of the formyl groups obtained from the results of the $^1$H-NMR measurement (solvent: chloroform-d) was 1.4 per the structural unit of the poly(arylene ether sulfone).

SYNTHESIS EXAMPLE 3

Synthesis of Poly(arylene ether sulfone) Having a Formyloxy Group:

22 g of the poly(arylene ether sulfone) having a formyl group obtained in Synthesis Example 2 was charged in a 2-liters three-necked flask, and dissolved in 820 ml of methylene chloride. 28 g of m-chloroperbenzoic acid was added to the solution, and the mixture was stirred at room temperature overnight. After completion of the reaction, 1 liter of a 4% sodium disulfite aqueous solution was added to the reaction mixture, and the mixture was well stirred to decompose the unreacted m-chloroperbenzoic acid. The methylene chloride phase was poured into 4 liters of n-hexane to form a precipitate. The precipitate was separated by filtration, thoroughly rinsed with methanol, and then dried in vacuo at 90° C. for 2 hours. Thus, 20 g of a polymer was obtained (yield: 90%).

As a result of the $^1$H-NMR measurement (solvent: dimethyl sulfoxide-d6 (the dimethyl sulfoxide will be abbreviated as "DMSO")), a peak based on an isopropylidene group was observed at δ1.7 ppm (s), a peak based on an aromatic ring was observed at δ6.8 to 8.0 ppm (m), and a peak based on a formyloxy group was observed at δ8.4 ppm (s).

Incidentally, the number of the formyloxy groups obtained from the results of the $^1$H-NMR measurement (solvent: DMSO-d6) was 1.4 per the structural unit of the poly(arylene ether sulfone). Further, the weight average molecular weight obtained by the GPC measurement (solvent: N,N-dimethylformamide) was 64,000 (as reduced to polystyrene), and the molecular weight distribution was 4.8.

SYNETHESIS EXAMPLE 4

Synthesis of Poly(arylene ether sulfone) Having a Hydroxyl Group:

16 g of the poly(arylene ether sulfone) having a formyloxy group as obtained in Synthesis Example 3 was charged in a 6 liters separable flask, and dissolved in 1.44 liters of tetrahydrofuran. 144 ml of methanol was added to the solution, followed by cooling in an ice bath. 30 g of sodium tetrahydroborate was added to the resulting solution, and the mixture was stirred at 0° C. Fifteen minutes after the stirring, the ice bath was taken off, and the mixture was stirred at room temperature for 3 hours. After completion of the reaction, 800 ml of methanol was added to the reaction mixture, and 2 liters of 0.5 mole/liter hydrochloric acid aqueous solution was then added thereto, to form a precipitate. The precipitate was separated by filtration, thoroughly rinsed successively with water and methanol, and then dried in vacuo at 90° C. for 2 hours. Thus, 14.8 g of a polymer was obtained (yield: 100%).

Figure 1:
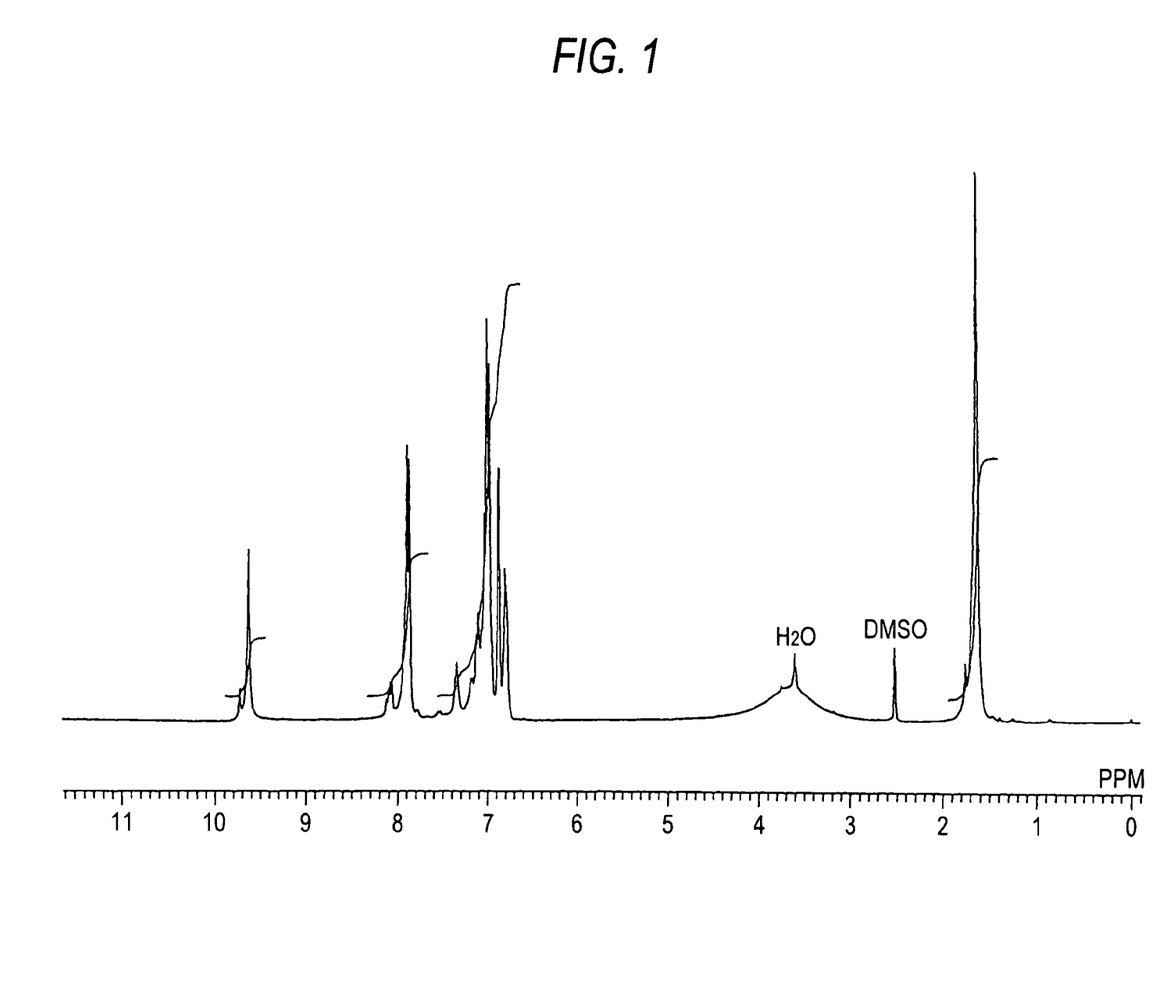
FIG. 1 shows the measurement results of $^1$H-NMR of a poly(arylene ether sulfone) having a hydroxyl group obtained in Synthesis Example 4.

The results of $^1$H-NMR of the obtained polymer are shown in FIG. 1.

As a result of the $^1$H-NMR measurement (solvent: DMSO-d6), a peak based on an isopropylidene group was observed at δ1.7 ppm (s), a peak based on an aromatic ring was observed at δ6.8 to 8.1 ppm (m), and a peak based on a hydroxyl group was observed at δ9.6 to 9.8 ppm (s).

As a result of the $^{13}$C-NMR measurement (solvent: DMSO-d6), a peak based on an isopropylidene group was observed at δ30.4 ppm, a peak based on an isopropylidene group was observed at δ41.9 ppm, and peaks based on carbons on an aromatic ring were observed at δ115.9 ppm, δ116.1 ppm, δ117.8 ppm, δ121.8 ppm, δ129.3 ppm, δ134.3 ppm, δ138.7 ppm, δ148.4 ppm, δ148.6 ppm and δ161.8 ppm.

Incidentally, the number of the hydroxyl groups obtained from the results of the $^1$H-NMR measurement (solvent: DMSO-d6) was 1.4 per the structural unit of the poly(arylene ether sulfone). Further, the weight average molecular weight obtained by the GPC measurement (solvent: N,N-dimethylformamide) was 55,000 (as reduced to polystyrene), and the molecular weight distribution was 5.3.

EXAMPLE 1

0.10 g of the poly(arylene ether sulfone) having a hydroxyl group (hydroxyl group: 0.30 mmoles) obtained in Synthesis Example 4 was charged in a 50 ml three-necked flask, and dissolved in 20 ml of tetrahydrofuran. 2.0 ml of a methanol solution containing 0.22 moles/liter of sodium methoxide (sodium methoxide: 0.44 mmoles) was added to the solution, and the mixture was stirred at room temperature for one hour. 0.48 ml (5.5 mmoles) of 1,3-propane sultone was added to the solution, and the mixture was stirred at room temperature for 12 hours. Further, 3 ml of a 0.6 moles/liter hydrochloric acid aqueous solution was added to the suspension to obtain a uniform solution. After completion of the reaction, the uniform solution was added to hexane (50 ml) to cause two-phase separation. Acetone was added to a lower phase of those phases to form a precipitate. The precipitate was separated by filtration and dried in vacuo at 100° C. for 3 hours. Thus, 0.033 g of a polymer was obtained (yield: 24%).

The polymer obtained was subjected to $^1$H-NMR and $^{13}$C-NMR measurements.

As a result of the $^1$H-NMR measurement (solvent: DMSO-d6), a peak based on an isopropylidene group was observed at δ1.7 ppm (s), a peak based on a methylene group in the center of a propylene group was observed at δ1.8 ppm (br), a peak based on a methylene group adjacent to a sulfo group was observed at δ2.4 ppm (br), a peak based on a methylene group adjacent to an ether group was observed at δ4.0 ppm (br), and a peak based on an aromatic ring was observed at δ6.8 to 8.1 ppm (m).

As a result of the $^{13}$C-NMR measurement (solvent: DMSO-d6), a peak based on a methylene group in the center of a propylene group was observed at δ25.4 ppm, a peak based on an isopropylidene group was observed at δ31.0 ppm, a peak based on an isopropylidene group was observed at δ43.1 ppm, a peak based on a methylene group adjacent to a sulfo group was observed at δ48.0 ppm, a peak based on a methylene group adjacent to an ether group was observed at δ67.9 ppm, and peaks based on carbons on an aromatic ring were observed at δ113.8 ppm, δ116.9 ppm, δ120.1 ppm, δ122.2 ppm, δ130.0 ppm, δ135.0 ppm, δ140.9 ppm, δ149.1 ppm, δ150.3 ppm, and δ162.3 ppm.

Figure 2:
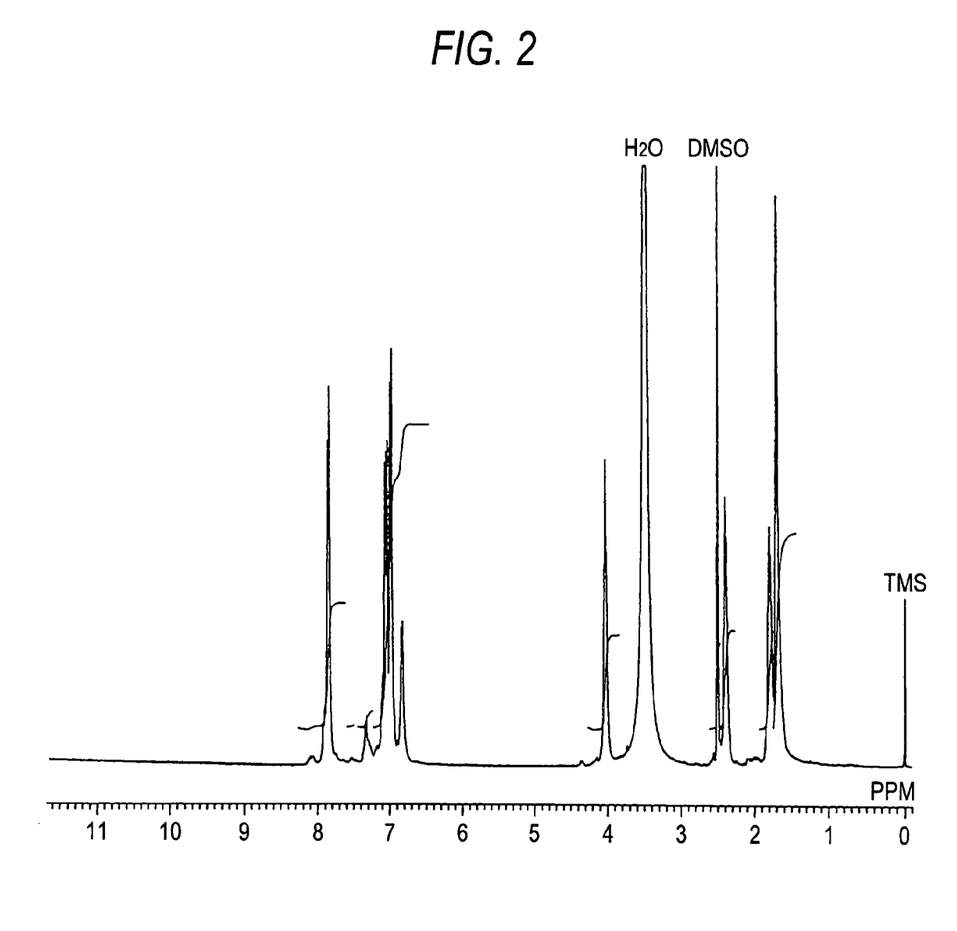
FIG. 2 shows the measurement results of $^1$H-NMR of a poly(arylene ether sulfone) having a sulfopropoxy group obtained in Example 1.

The $^1$H-NMR spectrum is shown in FIG. 2. From FIG. 2, a peak derived from the hydroxyl group of the starting material was not observed at δ9.6 to 9.8 ppm; and characteristic peaks derived from the sulfoalkoxy group were confirmed at δ1.8 ppm, δ2.4 ppm, and δ4.0 ppm. From this result, the polymer obtained was confirmed to be a poly(arylene ether sulfone) having a sulfopropxy group. Incidentally, the number of the sulfopropxy groups obtained from the results of the $^1$H-NMR measurement (solvent: DMSO-d6) was 1.4 per the structural unit of the poly(arylene ether sulfone). Further, the weight average molecular weight obtained by the GPC measurement (solvent: DMSO) was 73,000 (as reduced to pullulan), and the molecular weight distribution was 2.7.

EXAMPLE 2

0.50 g of the poly(arylene ether sulfone) having a hydroxyl group (hydroxyl group: 1.5 mmoles) synthesized in Synthesis Example 4 was charged in a 300 ml separable flask, and dissolved in 100 ml of tetrahydrofuran. 10 ml of a methanol solution containing 0.22 moles/liter of sodium methoxide (sodium methoxide: 2.2 mmoles) was added to the solution, and the mixture was stirred at room temperature for one hour. 2.4 ml (27 mmoles) of 1,3-propane sultone was added to the solution, and the mixture was stirred at room temperature for 12 hours. 9 ml of a 0.6 moles/liter hydrochloric acid aqueous solution was added to the suspension to obtain a uniform solution. After completion of the reaction, the solvent in the solution was removed using an evaporator, and the remaining solid was thoroughly rinsed with acetone. The solid was dried in vacuo at 60° C. for 6 hours. Thus, 0.63 g of a polymer was obtained (yield: 100%).

The polymer obtained was subjected to $^1$H-NMR and $^{13}$C-NMR measurements (solvent: DMSO-d6) in the same manner as in Example 1. As a result, the polymer was identified to be a poly(arylene ether sulfone) having a sulfopropoxy group. Incidentally, the number of the sulfopropxy groups obtained from the results of the $^1$H-NMR measurement was 1.1 per the structural unit of the poly(arylene ether sulfone).

EXAMPLE 3

2.0 g of the poly(arylene ether sulfone) having a hydroxyl group (hydroxyl group: 6.0 mmoles) synthesized in Synthesis Example 4 was charged in a 2,000 ml separable flask, and dissolved in 400 ml of tetrahydroftiran. 40 ml of a methanol solution containing 0.23 moles/liter of sodium methoxide (sodium methoxide: 9.2 mmoles) was added to the solution, and the mixture was stirred at room temperature for one hour. 14 ml (160 mmoles) of 1,3-propane sultone was added to the solution, and the mixture was stirred at room temperature for 96 hours. After stirring, a precipitate was separated by filtration and thoroughly rinsed with acetone, followed by drying in vacuo at 70° C. for one hour. The solid was dispersed in 100 ml of a 1 mole/liter hydrochloric acid aqueous solution and stirred at room temperature for one hour. The dispersion was separated by filtration and dried in vacuo at 40° C. for 6 hours. Thus, 2.2 g of a polymer was obtained (yield: 81%).

As a result of the $^1$H-NMR measurement (solvent: DMSO-d6), a peak based on an isopropylidene group was observed at δ1.7 ppm (s), a peak based on a methylene group in the center of a propylene group was observed at δ1.8 ppm (s), a peak based on a methylene group adjacent to a sulfo group was observed at δ2.4 ppm (s), a peak based on a methylene group adjacent to an ether group was observed at δ4.0 ppm (s), and a peak based on an aromatic ring was observed at δ6.8 to 8.1 ppm (m).

As a result of the $^{13}$C-NMR measurement (solvent: DMSO-d6), a peak based on a methylene group in the center of a propylene group was observed at δ25.4 ppm, a peak based on an isopropylidene group was observed at δ31.0 ppm, a peak based on an isopropylidene group was observed at δ43.1 ppm, a peak based on a methylene group adjacent to a sulfo group was observed at δ48.0 ppm, a peak based on a methylene group adjacent to an ether group was observed at δ67.9 ppm, and peaks based on carbons on an aromatic ring were observed at δ113.8 ppm, δ116.9 ppm, δ120.1 ppm, δ122.2 ppm, δ130.0 ppm, δ135.0 ppm, δ140.9 ppm, δ149.1 ppm, δ150.3 ppm, and δ162.3 ppm.

Incidentally, the number of the sulfopropxy groups obtained from the results of the $^1$H-NMR measurement (solvent: DMSO-d6) was 1.4 per the structural unit of the poly(arylene ether sulfone). Further, the weight average molecular weight obtained by the GPC measurement (solvent: DMSO) was 73,000 (as reduced to pullulan), and the molecular weight distribution was 2.7.

EXAMPLE 4

The reaction and post-treatment were carried out under the same conditions as in Example 3, except for changing the amount of 1,3-propane sultone used to 12 ml. After drying in vacuo, 2.2 g of a polymer was obtained (yield: 90%). The number of the sulfopropxy groups obtained from the results of the $^1$H-NMR measurement (solvent: DMSO-d6) was 1.0 per the structural unit of the poly(arylene ether sulfone).

EXAMPLE 5

0.10 g of the poly(arylene ether sulfone) having a hydroxyl group (hydroxyl group: 0.30 mmoles) synthesized in Synthesis Example 4 was charged in a 50 ml three-necked flask, and dissolved in 20 ml of tetrahydrofuran. 2.0 ml of a methanol solution containing 0.22 moles/liter of sodium methoxide (sodium methoxide: 0.44 mmoles) was added to the solution, and the mixture was stirred at room temperature for one hour. 0.15 g (1.1 mmoles) of 1,4-butane sultone was added to the suspension, and the mixture was stirred at room temperature for 12 hours. 3 ml of a 0.6 moles/liter hydrochloric acid aqueous solution was further added to the suspension to obtain a uniform solution. After completion of the reaction, the uniform solution was added to hexane (50 ml) to form a precipitate. The precipitate was separated by filtration and then dried in vacuo at 100° C. for one hour. Thus, 0.04 g of a polymer was obtained (yield: 29%).

The polymer obtained was subjected to $^1$H-NMR measurement (solvent: DMSO-d6).

As a result of the $^1$H-NMR measurement (solvent: DMSO-d6), a peak based on two methylene groups inside a butylene group was observed at $\delta$1.5 ppm (br), a peak based on an isopropylidene group was observed at $\delta$1.7 ppm (s), a peak based on a methylene group adjacent to a sulfo group was observed at $\delta$2.4 ppm (br), a peak based on a methylene group adjacent to an ether group was observed at $\delta$3.9 ppm (br), a peak based on an aromatic ring was observed at $\delta$6.8 to 8.1 ppm (m), and characteristic peaks derived from a sulfobutoxy group were observed at $\delta$1.5 ppm, $\delta$2.4 ppm, and $\delta$3.9 ppm. Thus, the polymer obtained was identified to be a poly(arylene ether sulfone) having a sulfobutoxy group. Incidentally, the number of the sulfobutoxy groups obtained from the results of the $^1$H-NMR measurement (solvent: DMSO-d6) was 1.2 per the structural unit of the poly (arylene ether sulfone). Further, the weight average molecular weight obtained by the GPC measurement (solvent: DMSO) was 51,000 (as reduced to pullulan), and the molecular weight distribution was 2.7.

EXAMPLE 6

2.0 g of the poly(arylene ether sulfone) having a sulfopropoxy group synthesized in Example 3 was dissolved in 4 ml of N,N-dimethylformamide. The solution was cast on a polyethylene terephthalate-made film (a trade name: Lumirror T60, produced by Toray Industries, Inc.), and height of the liquid film was made constant using a film blade, followed by allowing to stand at room temperature for 12 hours. The film was further dried at 80° C. for 8 hours, at 80° C. for 16 hours in vacuo, and then at 120° C. for 22 hours, to form a film. The film was rinsed with a 0.1 N hydrochloric acid aqueous solution, thoroughly rinsed with water, and then dried in vacuo at 100° C. for 8 hours. Thus, a poly (arylene ether sulfone) film having a sulfopropoxy group was obtained. This film was a pale brown, transparent and soft film having a thickness of 95 $\mu$m.

As a result of the measurement of proton conductivity at 50° C. and at a relative humidity of 90%, the film had a proton conductivity of 6.0×10$^{-2}$ S/cm and functioned as a polymer electrolyte membrane.

EXAMPLE 7

A film was formed in the same manner as in Example 6, except for using the poly(arylene ether sulfone) having a sulfopropoxy group obtained in Example 4 in place of the poly(arylene ether sulfone) having a sulfopropoxy group used in Example 6.

As a result of the measurement of proton conductivity at 50° C. and at a relative humidity of 90%, the film obtained had a proton conductivity of 2.6×10$^{-2}$ S/cm and functioned as a polymer electrolyte membrane.

EXAMPLE 8

The film obtained in Example 6 was measured for proton conductivity at 130° C. and at a relative humidity of 90%. As a result, the film had a proton conductivity of 4.8×10$^{-1}$ S/cm and functioned as a polymer electrolyte membrane.

As described above, the present invention provides a novel poly(arylene ether sulfone) having a sulfoalkoxy group, which has both of heat resistance and electroconductivity, is suitable as polymer electrolyte membranes used for high performance polymer electrolyte fuel cells, and does not use fluorine so that loads applied to the environment are small in the synthesis or disposal, a process of producing the same, and a polymer electrolyte membrane comprising the same.

It should further be apparent to those skilled in the art that various changes in form and detail of the invention as shown and described above may be made. It is intended that such changes be included within the spirit and scope of the claims appended hereto.

This application is based on Japanese Patent Application No. 2001-357457 filed Nov. 22, 2001 and Japanese Patent Application No. 2001-394291 filed Dec. 26, 2001, the disclosures of which are incorporated herein by reference in their entireties.

What is claimed is:

1. A poly(arylene ether sulfone) having a sulfoalkoxy group, which has a structural unit represented by the following formula (1):

(1)

wherein $R^1$ and $R^2$ independently represent a hydrogen atom or an alkyl group having from 1 to 6 carbon atoms; $R^3$ represents an alkylene group having from 1 to 10 carbon atoms; m represents an integer of 0 or 1; n represents an integer of 0 or 1; and (a+b+c+d) is greater than 0.

2. The poly(arylene ether sulfone) having a sulfoalkoxy group as claimed in claim 1, wherein in the formula (1), m is 1; n is 1; and $R^1$ and $R^2$ each represents a methyl group.

3. The poly(arylene ether sulfone) having a sulfoalkoxy group as claimed in claim 1, wherein in the formula (1), $R^3$ represents a propylene group or a butylene group.

4. The poly(arylene ether sulfone) having a sulfoalkoxy group as claimed in claim 1, wherein in the formula (1), (a+b+c+d) is from 0.1 to 4.0.

5. A process of producing the poly(arylene ether sulfone) having a sulfoalkoxy group, which has a structural unit represented by the following formula (1):

wherein $R^4$ and $R^5$ independently represent a hydrogen atom or an alkyl group having from 1 to 6 carbon atoms; i represents an integer of 0 or 1; i represents an integer of 0 or 1; and (e+f+t+g+h) is greater than 0, with an alkali metal compound and/or an organic base compound to form an alkali metal salt and/or an ammonium salt, and reacting the alkali metal salt and/or the ammonium salt with a sulfonating agent and then with an acid.

6. The process as claimed in claim 5, wherein the sulfonating agent is an alkyl sultone.

7. The process as claimed in claim 6, wherein the alkyl sultone is 1,3-propane sultone or 1,4-butane sultone.

8. The process as claimed in claim 5 wherein the alkali metal salt is formed and the alkali metal salt is reacted with the sulfonating agent and then with the acid.

(1)

wherein $R^1$ and $R^2$ independently represent a hydrogen atom or an alkyl group having from 1 to 6 carbon atoms; $R^3$ represents an alkylene group having from 1 to 10 carbon atoms; m represents an integer of 0 or 1; n represents an integer of 0 or 1; and (a+b+c+d) is greater than 0, said process comprising reacting a poly(arylene other sulfone) having a hydroxyl group, which has a structural unit represented by the following formula (2):

9. The process as claimed in claim 8, wherein the sulfonating agent is an alkyl sultone.

10. The process as claimed in claim 9, wherein the alkyl sultone is 1,3-propane sultone or 1,4-butane sultone.

11. A polymer electrolyte membrane comprising a poly(arylene ether sulfone) having a sulfoalkoxy group, which has a structural unit represented by the following formula (1):

(2)

(1)

wherein $R^1$ and $R^2$ independently represent a hydrogen atom or an alkyl group having from 1 to 6 carbon atoms; $R^3$ represents an alkylene group having from 1 to 10 carbon atoms; m represents an integer of 0 or 1; n represents an integer of 0 or 1, and (a+b+c+d) is greater than 0.

12. The polymer electrolyte membrane as claimed in claim 11, wherein the polymer electrolyte membrane has a thickness of from 1 to 300 μm.

* * * * *